(12) United States Patent
Damola et al.

(10) Patent No.: US 7,856,017 B2
(45) Date of Patent: Dec. 21, 2010

(54) TRAFFIC DIVERSION IN AN ETHERNET-BASED ACCESS NETWORK

(75) Inventors: Ayodele Damola, Kista (SE); Zere Ghebretensaé, Trångsund (SE); Hans Mickelsson, Sollentuna (SE); Torbjörn Cagenius, Sollentuna (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 365 days.

(21) Appl. No.: 11/914,473

(22) PCT Filed: May 22, 2006

(86) PCT No.: PCT/EP2006/004847

§ 371 (c)(1),
(2), (4) Date: Jan. 24, 2008

(87) PCT Pub. No.: WO2006/125594

PCT Pub. Date: Nov. 30, 2006

(65) Prior Publication Data

US 2008/0192756 A1      Aug. 14, 2008

(30) Foreign Application Priority Data

May 23, 2005   (WO) ................ PCT/EP2005/005564

(51) Int. Cl.
*H04L 12/28* (2006.01)

(52) U.S. Cl. ..................................................... 370/389
(58) Field of Classification Search ................. 370/389
See application file for complete search history.

(56) References Cited

U.S. PATENT DOCUMENTS

| 2002/0012585 | A1* | 1/2002 | Kalkunte et al. | 415/137 |
| 2003/0232615 | A1* | 12/2003 | Kim et al. | 455/405 |
| 2004/0105440 | A1* | 6/2004 | Strachan et al. | 370/389 |
| 2005/0122945 | A1* | 6/2005 | Hurtta | 370/338 |
| 2005/0147097 | A1* | 7/2005 | Chari et al. | 370/392 |

FOREIGN PATENT DOCUMENTS

WO   WO 2004006513 A1 *  1/2004

\* cited by examiner

*Primary Examiner*—Ayaz R Sheikh
*Assistant Examiner*—Hai-Chang Hsiung

(57) ABSTRACT

An arrangement and method for relieving the traffic load on an edge node in a broadband Ethernet-based access network, which normally employs traffic separation such that all traffic is routed via the edge node. Peer-to-peer traffic between end users places a large burden on the capacity of the edge node. The edge node identifies peer-to-peer traffic and generates address conversion information for access nodes connected to the end users concerned. The access nodes identify packets forming part of the peer-to-peer connection, modify address information to conceal the address of the source end user from the destination end user, and vice versa, and reroute the packets through the access network to the destination end user without passing through the edge node.

8 Claims, 7 Drawing Sheets

| Check | | | Modify | | |
|---|---|---|---|---|---|
| SA | D_IP | S_port | DA | SA | D_port |
| MAC1 | IP2 | Y | MAC2 | - | Uplink |
| MAC2 | IP1 | Uplink | - | MCS1 | Y |

AN1 Peer-to-Peer table

| Check | | | Modify | | |
|---|---|---|---|---|---|
| SA | D_IP | S_port | DA | SA | D_port |
| MAC1 | IP2 | Uplink | - | MCS2 | X |
| MAC2 | IP1 | X | MAC1 | - | Uplink |

AN2 Peer-to-Peer table

Fig. 5

| Check | | | Modify | | |
|---|---|---|---|---|---|
| SA | D_IP | S_port | DA | SA | D_port |
| MAC1 | IP2 | Y | VMAC2 | - | Uplink |
| MAC2 | IP1 | Uplink | MAC1 | MCS1 | Y |

AN1 Peer-to-Peer table

| Check | | | Modify | | |
|---|---|---|---|---|---|
| SA | D_IP | S_port | DA | SA | D_port |
| MAC1 | IP2 | Uplink | MAC2 | MCS2 | X |
| MAC2 | IP1 | X | VMAC1 | - | Uplink |

AN2 Peer-to-Peer table

TRAFFIC DIVERSION IN AN ETHERNET-BASED ACCESS NETWORK

FIELD OF INVENTION

The present invention is directed to the handling of peer-to-peer traffic within Ethernet-based access networks.

BACKGROUND ART

The volume of peer-to-peer traffic between users connected to the same access network has increased over the years. Although end users conducting peer-to-peer traffic are still in the minority, this form of traffic is characterized by large data volumes and consequently represents a disproportionately large share of the total traffic. Internet service providers have to provide more bandwidth to accommodate the traffic and they are also obliged to reduce over-subscription ratios and to increase network capacity. In a flat-rate charging model, these investments bring little or no return, as users pay a fixed fee regardless of the traffic volume generated. During peak hours, contention in best-effort traffic classes could lead to low responsiveness, undesirable delays and packet losses for other services, such as web browsing, leading to low customer satisfaction. Moreover, the ability of the service providers to support subscriber growth rates decreases. More significantly, the inter-exchange fees paid to other carriers for transporting traffic across foreign networks increases.

While peer-to-peer traffic poses a problem to service provider networks, the problem is perhaps more severe within the access networks themselves. Ethernet-based access networks typically use some form of traffic separation to prevent layer 2 connectivity between end users. One such method is forced forwarding, which directs all end-user traffic within the access network to an edge node; direct layer 2 connectivity is hence prevented. One example of forced forwarding is MAC forced forwarding, described in A. Wassen, "Technical overview of public Ethernet", EAB A-03:002114 Uen, 2003. In this scheme, traffic from all layer 2 access nodes and also from outside the access network is routed or "tunnelled" first to a layer 3 edge node. This node is capable of identifying the source and destination address and the identification of the access nodes and routing the packet to its destination within the access network.

Data collected from broadband access networks indicates that peer-to-peer traffic represents a large proportion of the traffic within an access network. Moreover, with the tendency for building large access networks, the volume of such traffic can only increase, resulting in an inordinately large proportion of the bandwidth between the access and edge nodes being occupied by what is predominantly low priority traffic. There is thus a need to provide a scheme, which, while maintaining traffic separation, ensures that the impact of peer-to-peer traffic on an Ethernet-based access network is reduced.

SUMMARY OF THE INVENTION

It is thus an object of the present invention to provide a method and arrangement whereby the impact of an increased volume of peer-to-peer traffic within an Ethernet-based broadband access network that supports traffic separation is reduced.

This and further objects are achieved in accordance with the present invention by the arrangement and method defined in the claims.

More specifically, the invention proposes a broadband access network having at least one access node that is connected to a plurality of end users and at least one routing node. The routing node is adapted to receive all data packets transmitted by access nodes within the access network and to reroute these packets towards their final destination. In accordance with the present invention, the routing node is capable of identifying received data packets that originate from a first end user connected to said access network and that are destined for a second end user connected to said access network, i.e. packets that are part of peer-to-peer traffic within the access network. The routing node is further able to generate address conversion information that is specific to data packets exchanged between the first and second end users and to transmit this address conversion information to the access node or nodes connected to the end users. The access node or nodes can then use this address conversion information to identify incoming packets forming part of the traffic between the first and second end users, to modify the address elements of the identified packets to conceal the end user addresses from both the source and destination end user and to redirect the packets to the destination end user without passing through the routing node.

In this manner, traffic between any two end users within the access network may be transmitted via the shortest route possible through the access network, while preserving the anonymity of both source and destination user.

Preferably, the address conversion table is maintained at the access node and routing node only while peer-to-peer traffic exists. This is achieved by setting a timer in the access node, which upon timeout informs the routing node that the connection is terminated and deletes its own address conversion information.

The routing node is able to identify whether peer-to-peer traffic is exchanged between end users connected to different access nodes. In this case it generates address conversion information for each access node. This information enables the access node that receives a packet identified as peer-to-peer from an end user to modify the destination address and route this packet towards a second access node connected to the destination end user. The information also enables the second access node to modify the source address of the packet before transmitting this to the destination end user in order to hide the identification of the sending user from the receiving user.

In accordance with a preferred embodiment of the invention, the address conversion information initially causes the access nodes to change the destination address of the packets from that representing the edge node to that representing the access node connected to the end user, rather than to the end user address directly. This latter conversion then takes place at the receiving access node at the same time as the source address of the packet is modified. The addresses in question are preferably media access control addresses that may be assigned specifically for peer-to-peer, or hairpin, traffic.

This has the advantage that the various switching nodes in the access network need to know, or acquire, only the access node addresses and not the end user addresses. Since the number of end user devices that may engage in peer-to-peer traffic is significantly greater than the number of access nodes presents in the network, this greatly reduces the demands on the network switches. The switches may then be standard off the shelf devices, which minimizes the cost of the network infrastructure. Similarly, the broadcast traffic generated by the switches prior to obtaining the destination network addresses is also kept to a minimum.

BRIEF DESCRIPTION OF THE DRAWINGS

Further objects and advantages of the present invention will become apparent from the following description of the preferred embodiments that are given by way of example with reference to the accompanying drawings. In the figures:

FIG. 5 depicts a conversion tables generated by the edge node for access nodes 1 and 2 in the access network of FIG. 4, FIG. 6 schematically illustrates the signaling involved in traffic diversion between the elements of an access network illustrated in FIG. 4 and using the conversion tables of FIG. 5, FIG. 7 depicts a conversion tables generated by the edge node for access nodes 1 and 2 in accordance with a third embodiment of the invention, and FIG. 8 schematically illustrates the conversion of packet header address elements involved in traffic diversion between the elements of an access network illustrated in FIG. 4 and using the conversion tables of FIG. 7.

DETAILED DESCRIPTION OF THE DRAWINGS

Figures 1, 2:
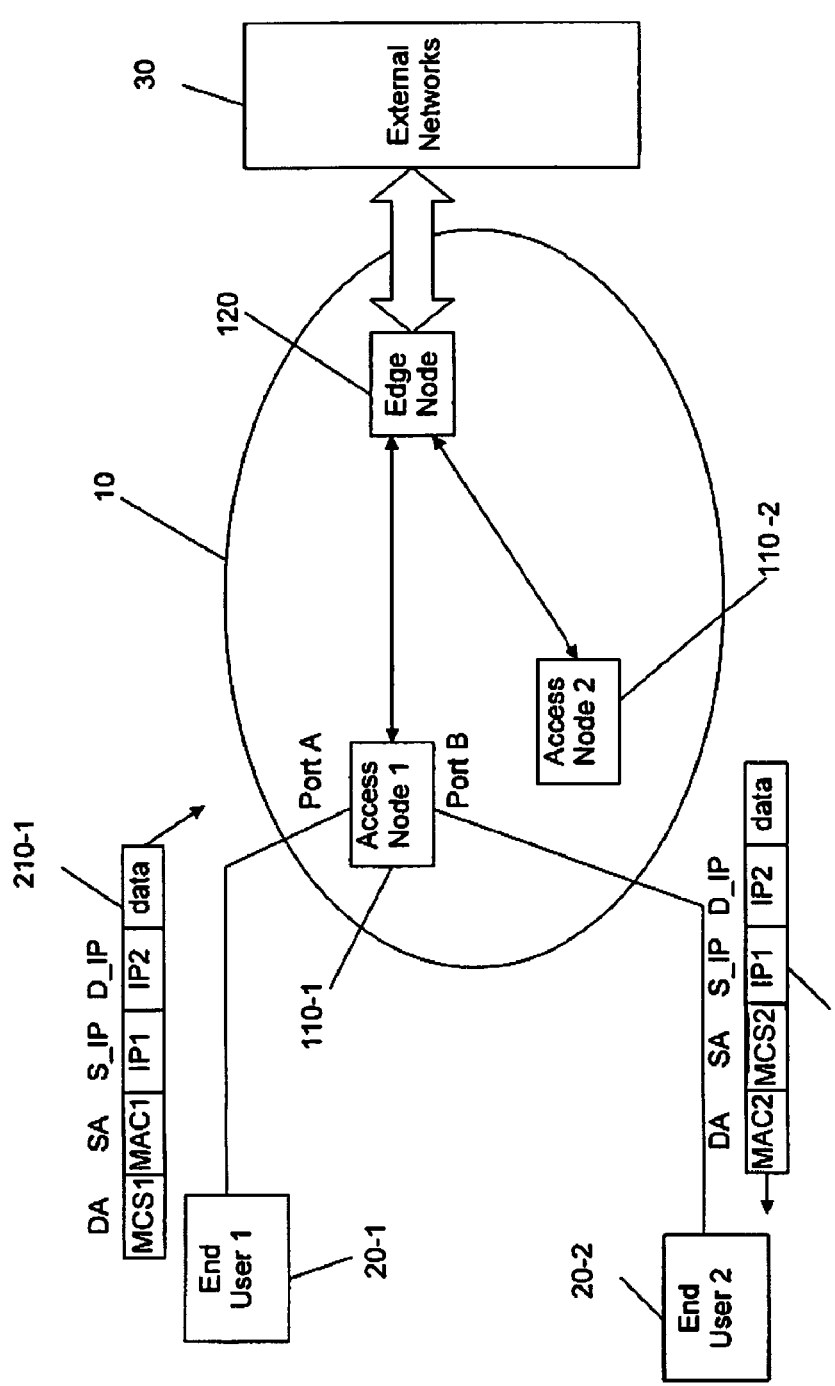
FIG. 1 schematically illustrates the elements of a broadband access network adapted to divert peer-to-peer traffic within the access network in accordance with a first embodiment of the invention.
FIG. 2 depicts a conversion table generated by the edge node for access node 1 in the access network of FIG. 1

Turning to FIG. 1 there is illustrated a portion of a broadband Ethernet-based access network 10. The access network 10 is shown with two access nodes AN1 and AN2, 110-1, 110-2 and is connected to one or more external networks 30 such as the Internet, or other IP-based networks or applications via an edge or routing node 120. For the sake of clarity only two nodes are illustrated in the figure, however, it will be understood that the access network may include many more access nodes 110 and, depending on its size, also additional edge nodes 120. Two subscriber hosts or end users 20-1 and 20-2 are shown connected to the access node AN1, 110-1, in the access network 10. The access network enforces traffic separation using a forced forwarding technique called MAC forced forwarding. In essence, to prevent layer-2 connectivity between end users 20, the forced forwarding mechanism causes the access nodes 110 to send all packets originating from end users to the edge node 120, where user authentication, policing and accounting is performed. Likewise, all incoming packets are directed first to the edge node 120, which then modifies the address information to route the packet to the final destination.

Peer-to-peer traffic between end users attached to the same access network 10 tends to concern file sharing, file transfers and other high volume traffic belonging to the best-effort class usually of the lowest priority. This form of traffic uses an excessive amount of the bandwidth between access nodes 110 and the edge node 120. In accordance with the present invention, this problem is alleviated by diverting peer-to-peer traffic within the access network such that it is redirected locally in the aggregation network without having to pass through the edge node.

A first embodiment of the invention, wherein peer-to-peer traffic is exchanged between end users connected to the same access node will be described with reference to FIGS. 1 to 3.

In FIG. 1, both end users EU1 20-1 and EU2 20-2 are connected to the same access node AN1 110. As illustrated at event 1 in FIG. 3, End user 1 EU1 20-1 transmits a packet to end user 2 EU2 20-2 as shown at 210-1. The packet 210-1 includes a destination MAC (Media Access Control) address DA as specified by the security and traffic separation technique employed. In MAC forced forwarding, this is the MAC address of the edge node 120 received by the end user EU1 whenever it sends an ARP (Address Resolution Protocol) request. The packet 210-1 further includes the MAC source address SA allocated to the End user EU1 20-1, the source IP address S_IP, which is the IP address of end user 1 20-1, and also the destination IP address D_IP which, in this case specifies the IP address of end user 2 20-2. This packet is routed to the edge node EN 120, which then determines if it relates to peer-to-peer traffic within the access network using a specific peer-to-peer algorithm as shown at event 2 of FIG. 3.

The algorithm identifies peer-to-peer traffic in one of two ways depending on the architecture of the edge node 120. If the edge node EN 120 supports a common routing table responsible for all downlink connections, identification can take place initially on the traffic plane. At this level, only the destination IP addresses of packets are checked. For example, if the look up in the edge node routing table indicates that the destination IP address is on the same port as the packet was received from, both end users plainly belong to the same access network.

An additional and more reliable check can then be performed on the control plane using information stored or accessible by the edge node 120 that provides end user traceability. The manner in which this information is stored and accessed depends on the traffic separation and security method utilized. For the purposes of this invention, a generic arrangement is assumed in which end user traceability information is provided in a database. Depending on the concrete implementation used the database contains the following information: the id of the access node to which the end user is connected, the port on the access node to which the user is connected, the VLAN (Virtual Local Area Network) or PVC (Permanent Virtual Circuit) via which user packets are sent and the MAC and IP addresses of the end user. By comparing the source and destination IP and MAC addresses of a received packet with end user information from the database, the edge node 120 is able to determine whether incoming packets originate from within the access network 10, and at the same time determine whether the packets are destined for the access network 10, and hence whether it is a peer-to-peer traffic packet.

Control plane identification is obviously slower than a check performed only on the traffic plane as it requires the querying of an external database. This procedure could be speeded up by modifying the edge node 120 to maintain a local copy of the external user traceability database.

Once peer-to-peer traffic has been identified, the edge node EN 120 may redirect future packets belonging to this traffic locally. However, service providers may wish to impose some restrictions on the peer-to-peer traffic that can be redirected. In this case, the edge node EN 120 would determine whether the traffic and/or the end users satisfy certain criteria. Examples of traffic criteria include, but are not limited to, volume and bandwidth and application type. For example, peer-to-peer traffic might be redirected only if it exceeds a certain volume or bandwidth threshold as specified by the service provider. Similarly, the policy for redirection of traffic could be based on the type of traffic as identified by source and destination tcp ports. For example, HTTP traffic and mail might be constrained to pass through the edge node 120, while file transfers (ftp) traffic would be redirected. Deploying layer 7 filtering would enable the application of the policy on sets of applications. Pattern-based recognition algorithms implemented in either hardware or software could be used to filter out traffic of specific applications.

On the user level, the redirection of peer-to-peer traffic might be available as part of a user's subscription, for example in return for a larger file transfer traffic quota or speed. If peer-to-peer traffic is offered as a service, it might be necessary to establish a separate traffic class with preset quality of service parameters within the access network. Service providers may also wish to limit peer-to-peer traffic redirection to their own customers or to the customers of another specific service provider with whom they have an agreement. Redirection of peer-to-peer traffic could then be applied only for specific subsets of IP addresses.

It will be understood that a combination of these policies may be applied and also that other criteria may be used to decide whether traffic should be redirected.

Figure 3:
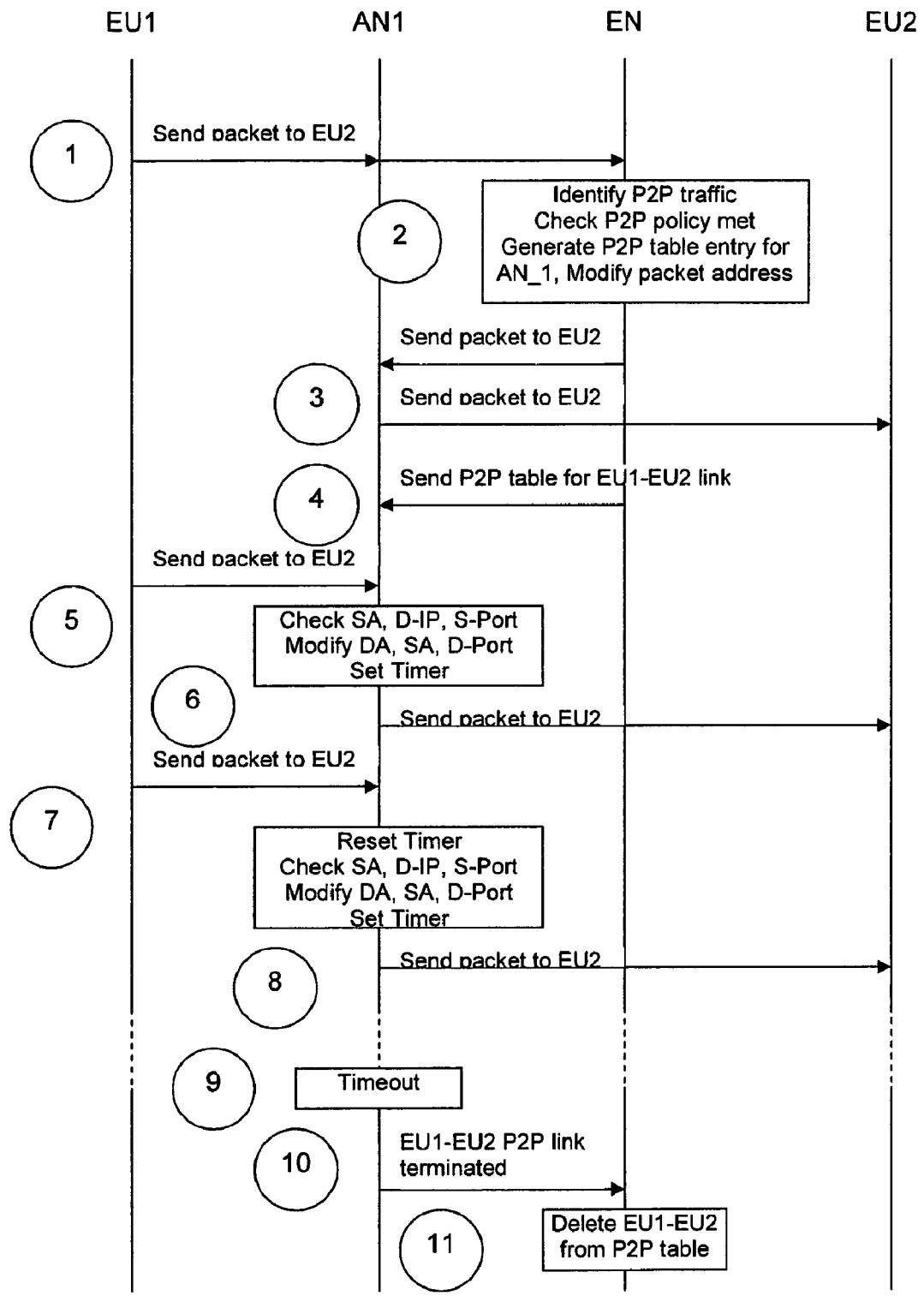
FIG. 3 schematically illustrates the signaling involved in traffic diversion between the elements of an access network illustrated in FIG. 1, FIG. 4 schematically illustrates the elements of a broadband access network adapted to divert peer-to-peer traffic within the access network in accordance with a second embodiment of the invention.

Once the edge node EN 120 has determined that a packet originates in, and is destined for, the access network, i.e. that it is part of peer-to-peer (P2P) traffic, and has determined that this traffic satisfies the applicable redirection policies, it generates a rerouting table 40 containing the rerouting information required for the diversion of traffic between the two users and sends this table in a management protocol message to access node 1 AN1 110 as shown at event 4 in FIG. 3, after having previously transmitted the packet to end user EU2 20-2 via the access node 1 110. The rerouting table 40 is illustrated in FIG. 2 and will be described in more detail below. The edge node EN 120 also retains a copy of the rerouting table 40. In this way the edge node EN 120 monitors all peer-to-peer connections in the network.

In response to the management protocol message from the edge node EN 120, the access node AN1 110 implements a peer-to-peer diversion algorithm using the rerouting table 40 to redirect peer-to-peer traffic locally between the users identified by the edge node without having to pass through the edge node 120.

As shown in FIG. 2, the rerouting table 40 identifies the elements of a packet that characterize traffic belonging the peer-to-peer connection, i.e. those elements that must be checked when identifying packets in this peer-to-peer traffic connection, specifically the MAC source address SA, the destination IP-address D_IP and the source port S_port. It also lists the address modifications that must be made to enable redirection, namely the MAC destination address DA, the MAC source address SA and the destination port D_port. The first entry in table 40 relates to traffic from end user 1 to end user 2; the second entry relates to traffic transmitted in the opposite direction, namely from end user 2 to end user 1. It will be understood that while only one duplex connection is illustrated in FIG. 2, the table 40 may contain rerouting information relating to other peer-to-peer connections that are ongoing simultaneously. As shown at event 5 of FIG. 3, the peer-to-peer diversion algorithm in the access node AN1 20-1 checks the fields of every incoming packet 210-1 and if they match those listed in the table 40, it modifies the MAC destination address, MAC source address and destination port and sends the packet to the port as specified in the table 40 and on to the end user 2 20-2 at event 6. By modifying these elements of the address, traffic separation is ensured as the receiving end user EU2 20-2 receives the packet as shown at 210-2 in FIG. 1 with the source MAC address modified to conceal the true source. In FIGS. 1 and 2, the source address of the received packet 210-2 is given as MCS2, while the destination address of the transmitted packet 210-1 is given as MCS1. However, it will be understood that the actual address substituted in the access node 110-1 will depend on the traffic separation scheme utilized. It is quite possible that the source and destination addresses MCS1 and MCS2 are the same and both represent the edge node 120 as will be the case when MAC forced forwarding is employed in the access network.

The access node AN1 110 also sets a timer each time a packet is identified as relating to a peer-to-peer link, for example, whenever the address modifications specified in the table are performed. If a further incoming packet is identified as being part of this connection as shown at event 7 of FIG. 3, the timer is reset. Once the set time interval has elapsed as shown at event 9, the access node AN1 110 sends a message via a management protocol to the edge node 120 informing it that the connection is terminated as shown at event 10. At event 11, the edge node EN 120 responds to this message by removing this connection information from its peer-to-peer table.

Figure 4:
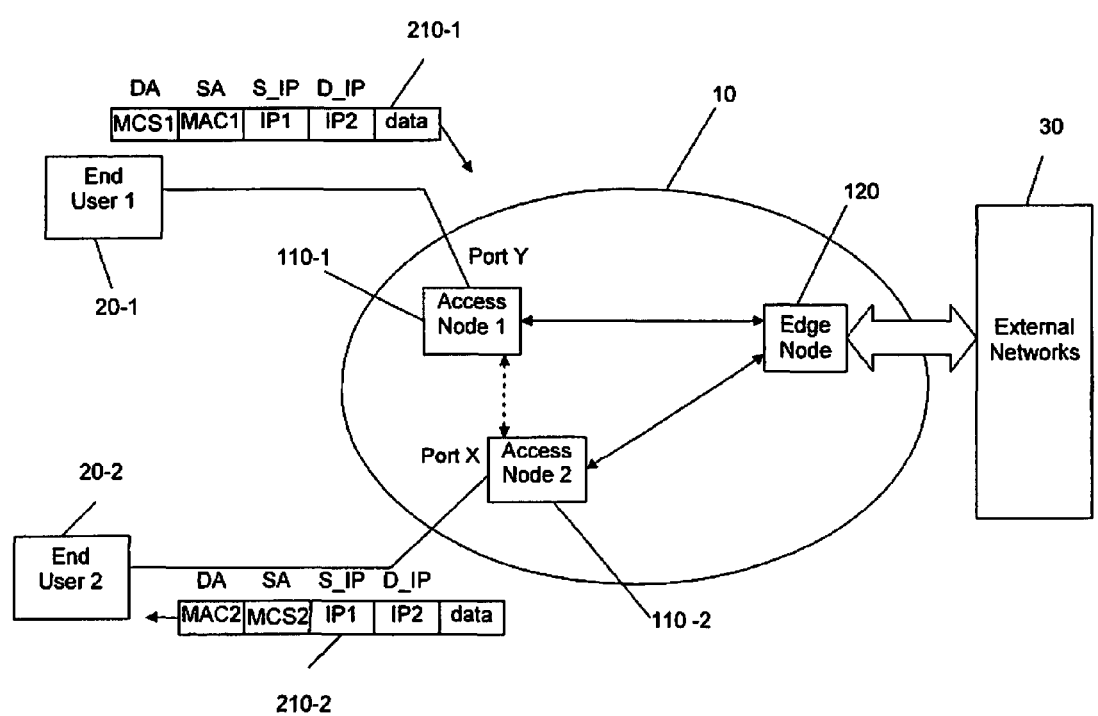
Figure 6:
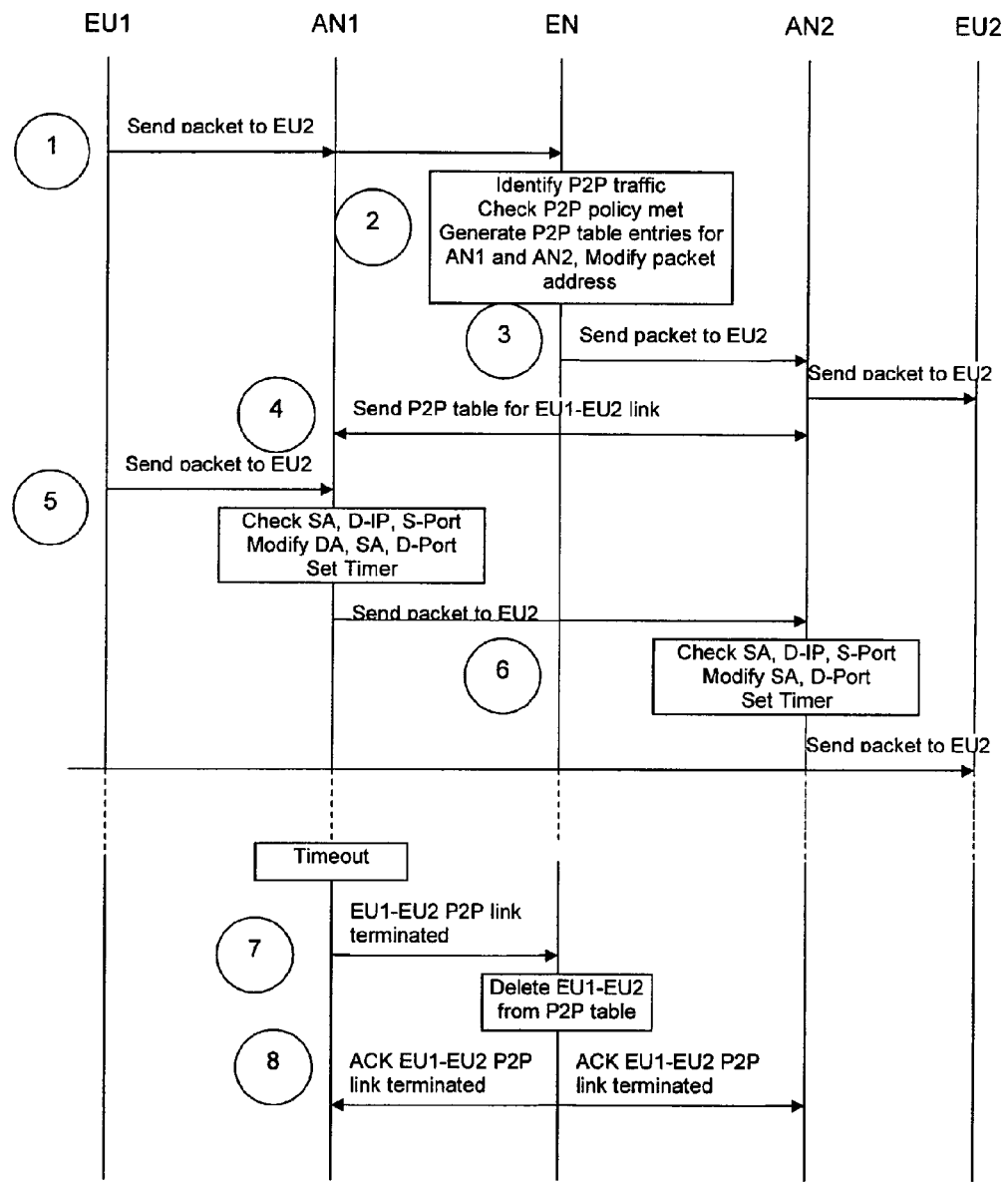

Turning now to FIGS. 4 to 6, a further embodiment of the invention is illustrated for the case when peer-to-peer traffic is conducted between end users connected to different access nodes in the access network. In FIG. 4 the same reference numerals have been used to denote like parts in FIG. 1, so a description of those parts will not be repeated here. As is depicted in FIG. 4, the first end user EU1 20-1 is connected to port Y of a first access node AN1 110-1. The second end user EN2 20-2 is connected to port X of a second access node AN2 110-2. As shown in FIG. 3 and FIG. 6 at event 1, the first end user EU1 20-1 transmits a packet 210-1 destined for the second end user 20-2. However, as in the embodiment illustrated in FIGS. 1 to 3, the MAC destination address DA is not that of the second end user EU2, but rather is modified in accordance with the traffic separation technique utilized. When MAC forced forwarding is utilized in accordance with the preferred embodiment, the MAC destination address represents the edge node EN 120. The access node AN1 thus forwards this packet to the edge node EN 120. At event 2 of FIG. 6, the edge node checks the packet, identifies it as peer-to-peer traffic via two access nodes AN 110, and, if applicable, ascertains that the traffic meets the relevant redirection criteria. The edge node then creates two tables 50, 60 as illustrated in FIG. 5, one for each of the access nodes AN1 110-1, AN2 110-2, reroutes the packet to the second end user EU2 via the access node AN2 at event 3 and subsequently transmits the tables 50, 60 to the corresponding access node 1 10-1, 110-2 in a management protocol message as shown at event 4. Copies of the tables are also stored at the edge node EN 120.

As shown in FIG. 5, the table 50 shown in the top half of the figure represents the information transmitted to access node AN1 110-1 and the table 60 in the bottom half of the figure represents that transmitted to access node AN2 110-2. The fields of each table are identical to those shown in table 40 shown in FIG. 2. The first entry of each table 50, 60 relates to packets transmitted from end user EU1 to end user EU2; the second entry relates to packets transmitted in the opposite direction, namely from end user EU2 to end user EU1. Accordingly, for all packets sent by end user EU1 and destined for end user EU2, the first access node AN1 110-1 identifies the source address as MAC1, the destination IP address IP2 and the source port Y and modifies only the MAC destination address to that of end user EU2, namely MAC2, and the destination port to simply "uplink". When the packet arrives at the second access node AN2 110-2, this node then modifies the destination port to the port to which end user 2 is connected and also the MAC source address to that defined by the security technique employed. In the present case this is the MAC address of the edge node EN 120 MCS1 in accordance with the requirements of MAC forced forwarding. Thus as for the embodiment illustrated in FIGS. 1 to 3, redirected peer-to-peer packets received by an end user will have the MAC address of the edge node EN 120. An analogous modification of the address information takes place in the access nodes AN 110 for packets sent from end user EU2 to end user EU1 as shown in the lower entry in each table 50, 60.

Accordingly, when a packet destined for end user EU2 is received by the first access node AN1 110-1 from end user EU2 as shown at event 5 in FIG. 6, the access node AN1 110-1 checks the MAC source address, destination IP address and source port, ascertains that there is a match in the peer-to-peer traffic table and accordingly modifies the MAC destination address and destination port in accordance with the second entry in table 50. The packet is then transmitted to the second access node AN2. Between the access nodes AN1, AN2, the packet is switched via the shortest path in the access network as determined by the spanning tree protocol. When this modified packet is received by the second access node AN2 as shown at event 6, this node also determines a match in its peer-to-peer table and modifies the source address and destination port in accordance with the first entry of table 60. The packet is then send to end user EU2. Each time one of the access nodes AN1 110-1, AN2 110-2 accesses its peer-to-peer traffic table 50, 60 to modify address information, a timer is set. If after a specified timeout value no traffic is received for the peer-to-peer connection a management protocol message is sent to the edge node EN 120 indicating that the connection is terminated as shown at event 7. The edge node EN 120 then deletes the relevant table entries from its peer-to-peer traffic table and confirms the connection termination with an acknowledgement message to both access nodes at event 8. The access nodes AN1 110-1 and AN2 110-2 can then also delete the corresponding entries from their own peer-to-peer tables 50, 60.

In accordance with a third embodiment of the present invention, traffic diversion is provided for peer-to-peer traffic between two end users 10-1, 10-2 connected to different access nodes 110-1, 110-2 while safeguarding traffic separation, but in addition, the requirements on the nodes or switches in the aggregation network is greatly reduced.

Specifically, the implementation of the conversion tables of FIG. 5 requires the aggregation network switches to learn the MAC addresses of end users EU 20 involved in peer-to-peer traffic exchange, which, potentially, will be all end user devices EU 20 in the access network. This requires switches to have sufficient storage capabilities, which precludes the use of most off-the-shelf devices. In the case where the switches cannot hold the MAC addresses of potential peer-to-peer end users, there will be an increase in broadcast traffic for peer-to-peer connections as the switches try to deliver the packets by broadcasting the packets on all their ports apart from the port from which the packets originated.

In accordance with this third embodiment of the invention virtual MAC (VMAC) addresses are assigned to the access nodes 110 for the rerouting of peer-to-peer traffic. These VMAC addresses are thus used to reroute peer-to-peer traffic through the aggregation network to the access node 110 to which the destination end user 20 is connected. This destination access node 110 then converts the destination MAC address from the access node VMAC address to the end user MAC address.

Referring now to FIG. 4, it will be understood that the headers of packets transmitted to and from end nodes 20 to the corresponding access nodes 110 will be the same as those transmitted in the second embodiment and illustrated in FIG. 4. The packet header will differ from that used in the earlier embodiment only for the path between the two access nodes AN1 and AN2 110-1, 110-2; this modification ensures that only the destination access node AN2 110-2 needs to store or acquire the end user MAC addresses. Consequently, the sequence of events will be the same as that illustrated in FIG. 6 but using different conversion tables.

FIG. 7 shows the conversion data generated by the edge node EN 120 and subsequently held in tables at the access nodes AN1 and AN2 110-1, 110-2 in accordance with this third embodiment. As can be seen from these tables, the same address elements are used to identify the packets relating to peer-to-peer traffic.

Figure 8:
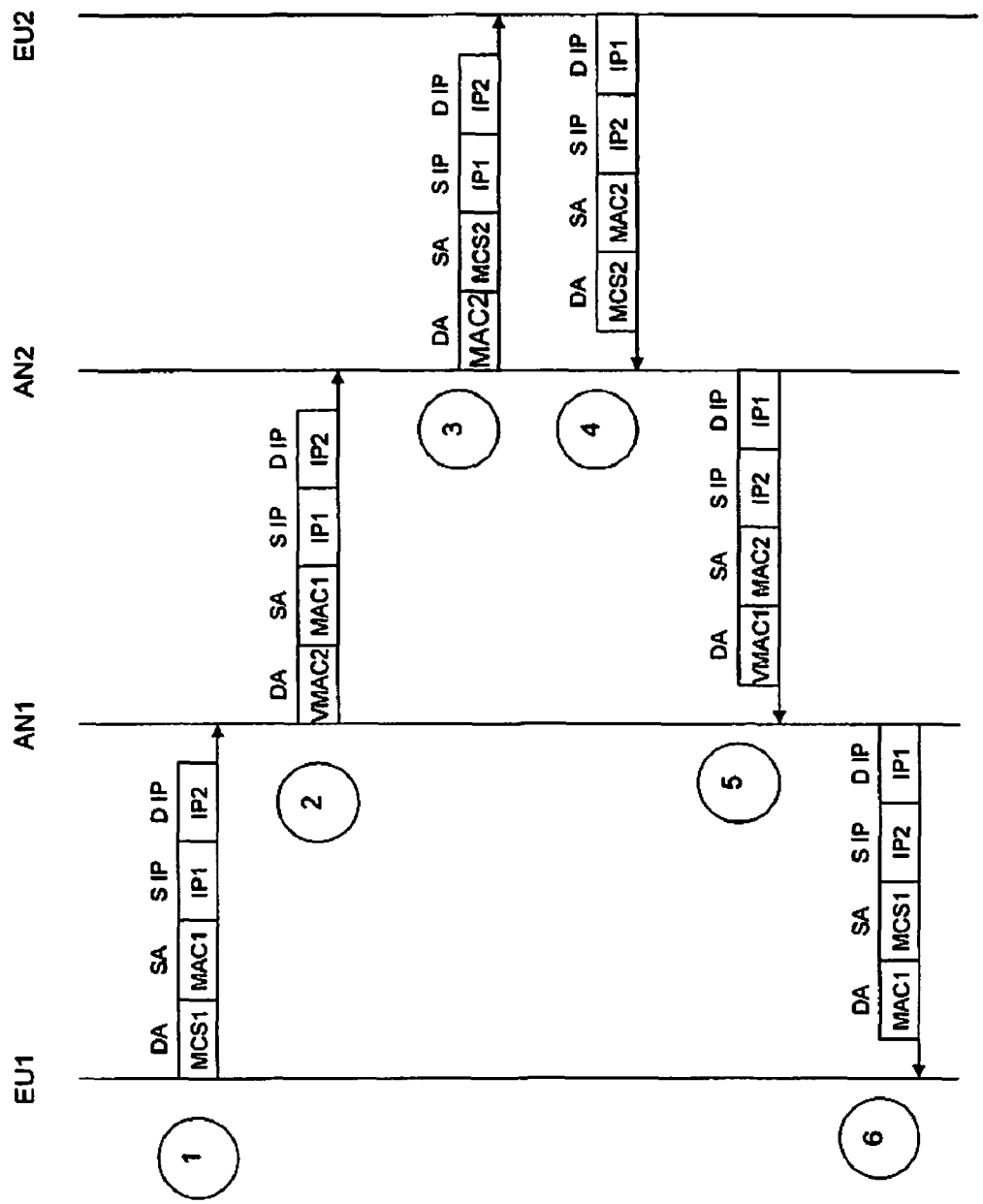

The conversion is illustrated in FIG. 8. As can be seen in FIG. 8, a packet is sent from end user EU1 20-1 to the access node AN2 110-1 at event 1. The address in the header specifies the MAC address MCS1 of the edge node as destination MAC address, the MAC address of end user EU1 as the source MAC address, the IP address of the end user EU1 as the source IP address and the IP address of the destination end user EU2 as the IP destination address. In access node AN1 110-1, the packet is identified as peer-to-peer traffic between end user EU1 20-1 and end user EU2 20-2 using the address information specified in the first line of the AN1 peer-to-peer table of FIG. 7. Specifically, access node AN1 ascertains that the packet header contains the MAC source address of EU1, namely MAC1, and the destination IP address of EU2, namely IP2. The access node AN1 then modifies the header to change the destination MAC address from that specifying the edge node EN 120 to the virtual MAC address assigned to access node AN2, VMAC2. This packet is then rerouted to access node AN2 at event 2. Upon reception of this packet by the destination access node AN2 110-2, it is again identified as peer-to-peer traffic using the same source address and destination IP address as used by AN1 as specified in the first line of the AN2 peer-to-peer table in FIG. 7. The access node AN2 110-2 then modifies the packet header once again to conceal the real source address from the destination end user EU2 20-2 by changing the source address to the MAC address of the edge node EN 120, MCS2 in accordance with the employed traffic separation technique, and the destination MAC address from VMAC2 to that of the end user, MAC2, as indicated in the first row of the AN2 peer-to-peer table. This modified packet is then transmitted to the end user EU2 at event 3.

In the reverse direction, packets are identified by the same header fields. Specifically at event 4, AN2 receives the packet on port X and identifies the source address of end user EU2 20-2, MAC2, and the IP destination address of end user EU1, 20-1, which is IP1 as indicated in the first row of AN2 peer-to-peer table in FIG. 7. Access node AN2 110-2 then modifies the destination address and port to the virtual MAC address assigned to access node AN1 110-1, VMAC1, and the uplink port and reroutes the packet to the access node AN1 110-1 at event 5. Upon receipt of this packet by access node AN1 110-1, it is identified as peer-to-peer traffic by ascertaining a match with the address elements given in the second line of the AN1 peer-to-peer table of FIG. 7, namely the source address and destination IP address. Access node AN1 then modifies the destination address and source address to that indicating the source address corresponding to the edge node EN 120 and sends the packet to port X from where it is transmitted to end user EU1.

The first time a packet is rerouted according to a peer-to-peer table towards the destination end user, that is the first transmission shown at event 1 or event 4, the packet is broadcast in the aggregation network. Once the switches in the aggregation network have learnt the destination indicated by the virtual MAC addresses, VMAC1 and VMAC 2 using ARP requests, the following peer-to-peer packets will be transmitted via the shortest possible path as defined by the spanning tree protocol. Since there will be far fewer access nodes than end users in any access network, this significantly reduces the amount of broadcast traffic required to reroute peer-to-peer traffic.

The invention claimed is:

1. A broadband access network, comprising:
first and second access nodes connected to a plurality of end users;
an edge node for receiving data packets transmitted by the first and second access nodes and for rerouting each data packet to another access node or to a destination external to the access network;
wherein all packets transmitted from end users connected to the access network specify a destination media access control (MAC) address representing the edge node, and wherein all packets received by end users connected to the access network specify a source MAC address representing the edge node;
wherein the edge node includes:
means for identifying packets originating from a first end user connected to the first access node in the access network and destined for a second end user connected to the second access node in the access network; and
means for generating and transmitting address conversion information to both the first and second access nodes, the address conversion information being specific to data packets exchanged between the first and second end users;
wherein the first access node includes means for utilizing the address conversion information to modify the address information of packets identified as traffic between the first and second end users such that the destination MAC address is changed from that representing the edge node to that representing the destination end user, and to route the packet to the second access node;
wherein the second access node includes means for utilizing the address conversion information to modify the address information of packets identified as traffic between the first and second end users such that the source MAC address is changed from that representing the source end user to that representing the edge node; and
wherein the first and second access nodes redirect the identified packets to the destination end user without passing through the edge node and without revealing the MAC addresses of the first and second end users to each other.

2. A broadband access network, comprising:
first and second access nodes connected to a plurality of end users;
an edge node for receiving data packets transmitted by the first and second access nodes and for rerouting each data packet to another access node or to a destination external to the access network;
wherein all packets transmitted from end users connected to the access network specify a destination media access control (MAC) address representing the edge node, and wherein all packets received by end users connected to the access network specify a source MAC address representing the edge node;
wherein the edge node includes:
means for identifying packets originating from a first end user connected to the first access node in the access network and destined for a second end user connected to the second access node in the access network; and
means for generating and transmitting address conversion information to both the first and second access nodes, the address conversion information being specific to data packets exchanged between the first and second end users;
wherein the first access node includes means for utilizing the address conversion information to modify the address information of packets identified as traffic between the first and second end users such that the destination MAC address is changed from that representing the edge node to that representing the second access node and to route the packets to the second access node;
wherein the second access node includes means for utilizing the address conversion information to modify the address information of packets identified as traffic between the first and second end users such that the destination MAC address is changed from that representing the second access node to that representing the destination end user and such that the source MAC address is changed from that representing the source end user to that representing the edge node; and
wherein the first and second access nodes redirect the identified packets to the destination end user without passing through the edge node and without revealing the MAC addresses of the first and second end users to each other.

3. The access network as recited in claim 2, wherein the access network is a broadband, Ethernet-based network.

4. A method of redirecting traffic within a broadband access network having a plurality of access nodes, each connected to end users, and at least one edge node, wherein data packets sent by the end users to the access network and received by the access network are addressed to the edge node, the method comprising the steps of:
identifying by the edge node, packets that originate from a first end user connected to the access network and are destined for a second end user connected to the access network;
generating by the edge node, address conversion information specific to the exchange of packets between the first and second users;
transmitting the information from the edge node to at least one access node via which the first and second end users are connected to the access network;
utilizing the address conversion information by the access node to identify packets exchanged between the first and second end users;
utilizing the address conversion information by the access node to modify addresses of the identified packets by changing a destination media access control (MAC) address from that representing the edge node to that representing the destination end user and by changing a source MAC address from that representing the source end user to that representing the edge node, wherein the step of changing the destination MAC address of the packet includes changing the destination MAC address of the packet in a first access node connected to the source end user from an address representing the edge node to an address representing a second access node connected to the destination end user and changing the destination MAC address from an address representing the second access node to an address representing the destination end user in the second access node, and wherein the step of changing the source MAC address is performed by the second access node; and rerouting the packets by the access node through the access network to the destination end user without passing through the edge node in accordance with the modified packet address.

5. The method as recited in claim 4, wherein the step of identifying packets exchanged between the first and second end users includes ascertaining that an incoming packet has a source MAC address and access node port representing one of the first and second end users and a destination Internet Protocol (IP) address representing the other of the first and second end users.

6. The method as recited in claim 4, further comprising the following steps performed by the access node:

establishing that no packets have been rerouted between the first and second end users for a predetermined time;

informing the edge node that the connection is terminated; and deleting the address conversion information.

7. The method as recited in claim 4, wherein the step of identifying packets that originate from a first end user connected to an access network and are destined for a second end user connected to the access network includes comparing a destination Internet Protocol (IP) address of each received packet with an IP source address of the received packet.

8. The method as recited in claim 4, wherein the step of identifying packets that originate from a first end user and are destined for a second end user includes comparing an Internet Protocol (IP) address and the MAC address of the packet with at least one of:

an identifier of the access node to which an end user is connected;

a port on the access node to which an end user is connected;

a Virtual Local Area Network via which user packets are transmitted;

a Permanent Virtual Circuit in which user packets are transmitted;

a MAC address of an end user; and an IP address of an end user.

\* \* \* \* \*

UNITED STATES PATENT AND TRADEMARK OFFICE
CERTIFICATE OF CORRECTION

PATENT NO.         : 7,856,017 B2
APPLICATION NO.    : 11/914473
DATED              : December 21, 2010
INVENTOR(S)        : Damola et al.

Page 1 of 1

It is certified that error appears in the above-identified patent and that said Letters Patent is hereby corrected as shown below:

In Column 6, Line 33, delete "EN2 20-2" and insert -- EU2 20-2 --, therefor.

In Column 6, Lines 51-52, delete "1 10-1" and insert -- 110-1 --, therefor.

Signed and Sealed this
Twenty-third Day of August, 2011

David J. Kappos
*Director of the United States Patent and Trademark Office*